(12) United States Patent
Li et al.

(10) Patent No.: US 9,319,252 B2
(45) Date of Patent: Apr. 19, 2016

(54) PRECODING AND FEEDBACK CHANNEL INFORMATION IN WIRELESS COMMUNICATION SYSTEM

(75) Inventors: Jianjun Li, Seoul (KR); Kyoungmin Park, Goyang-si (KR)

(73) Assignee: Pantech Co., Ltd., Seoul (KR)

( * ) Notice: Subject to any disclaimer, the term of this patent is extended or adjusted under 35 U.S.C. 154(b) by 468 days.

(21) Appl. No.: 13/500,288

(22) PCT Filed: Oct. 6, 2009

(86) PCT No.: PCT/KR2009/005705
§ 371 (c)(1),
(2), (4) Date: Apr. 4, 2012

(87) PCT Pub. No.: WO2011/043497
PCT Pub. Date: Apr. 14, 2011

(65) Prior Publication Data
US 2012/0201282 A1    Aug. 9, 2012

(51) Int. Cl.
*H04B 7/02* (2006.01)
*H04L 25/03* (2006.01)
*H04B 7/04* (2006.01)
*H04B 7/06* (2006.01)
*H04W 48/08* (2009.01)

(52) U.S. Cl.
CPC ........ *H04L 25/03343* (2013.01); *H04B 7/0417* (2013.01); *H04B 7/0426* (2013.01); *H04B 7/065* (2013.01); *H04B 7/0639* (2013.01); *H04L 2025/03808* (2013.01); *H04W 48/08* (2013.01)

(58) Field of Classification Search
CPC .......... H04B 7/0417; H04B 1/40; H04B 3/23; H04B 1/403; H04B 7/0639; H04B 7/065; H04B 7/0426; H04L 27/2601; H04L 1/0025; H04L 25/03343; H04L 2025/03808; H04W 48/08
USPC ................ 375/267, 260, 259, 316, 295, 219; 455/509
See application file for complete search history.

(56) References Cited

U.S. PATENT DOCUMENTS

| | | | |
|---|---|---|---|
| 2003/0220103 A1* | 11/2003 | Kim et al. | 455/422.1 |
| 2008/0260058 A1* | 10/2008 | Li | 375/260 |
| 2009/0190685 A1* | 7/2009 | Kimura | 375/267 |
| 2010/0202372 A1* | 8/2010 | Chun et al. | 370/329 |
| 2011/0085507 A1* | 4/2011 | Jongren | 370/329 |
| 2011/0096658 A1* | 4/2011 | Yang et al. | 370/210 |
| 2011/0256897 A1* | 10/2011 | Taoka et al. | 455/509 |
| 2012/0213310 A1* | 8/2012 | Ko et al. | 375/295 |

FOREIGN PATENT DOCUMENTS

| | | |
|---|---|---|
| WO | 03/021795 | 3/2003 |
| WO | 03/084092 | 10/2003 |
| WO | 2007/051192 | 5/2007 |

OTHER PUBLICATIONS

International Search Report issued for relate International Application No. PCT/KR2009/005705 dated May 31, 2010.

* cited by examiner

*Primary Examiner* — Zewdu Kassa
(74) *Attorney, Agent, or Firm* — H.C. Park & Associates, PLC

(57) ABSTRACT

The present invention relates to precoding and feedback channel information in wireless communication system.

6 Claims, 3 Drawing Sheets

PRECODING AND FEEDBACK CHANNEL INFORMATION IN WIRELESS COMMUNICATION SYSTEM

CROSS-REFERENCE TO RELATED APPLICATION

This application is the National Stage Entry of International Application PCT/KR2009/005705, filed on Oct. 6, 2009, which is incorporated herein by reference for all purposes as if fully set forth herein.

BACKGROUND

1. Field

The present invention relates to precoding and feedback channel information in wireless communication system.

2. Discussion of the Background

There are a number of multi-antenna transmission schemes or transmission such as transit diversity, closed-loop spatial multiplexing or open-loop spatial multiplexing. Closed-loop MIMO(CL-MIMO) relies on more extensive feedback from the mobile terminal.

SUMMARY

In accordance with an aspect, there is provided a method or a system, comprising: mapping one or two codewords to the layers; precoding a mapped set of symbols using a precoding matrix derived from at least two downlink channel information where one of them is for rank adaptation and power allocation and the other of them is for the precoding without rank adaptation and power allocation and transmitting a signal that comprises the precoded set of symbols.

In accordance with another aspect, there is provided a method or a system for feedbacking channel information for the mobile terminal, the method comprising: estimating a downlink channel from the received signal; selecting one matrix for rank adaptation plus power allocation and the other matrix for the precoding without rank adaptation and power allocation based on the estimated channel state information and feedbacking the PMI (Precoding Matrix Index) of the selected matrix for rank adaptation and power allocation by long term and the PMI of the selected matrix for the original precoding by short term to the base station.

Figure 1:
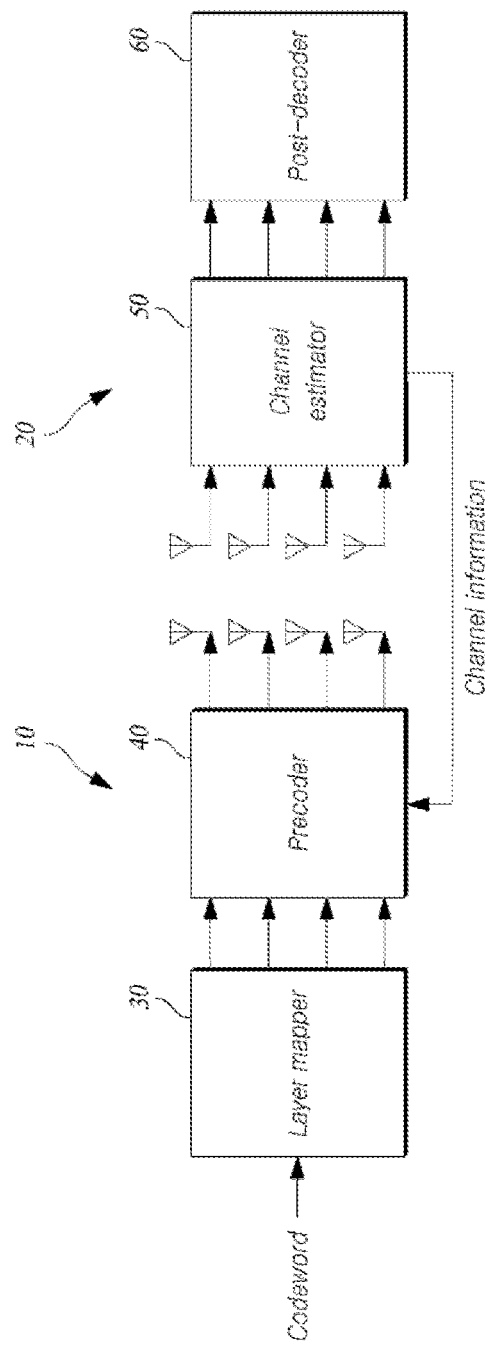
FIG. 1 is the block diagram of the wireless communication system using closed-loop spatial multiplexing according to one embodiment.

It will be appreciated that for simplicity and clarity of illustration, elements illustrated in the drawings have not necessarily been drawn to scale. For example, the dimensions of some of the elements are exaggerated relative to other elements for purposes of promoting and improving clarity and understanding. Further, where considered appropriate, reference numerals have been repeated among the drawings to represent corresponding or analogous elements.

DETAILED DESCRIPTION OF THE ILLUSTRATED EMBODIMENTS

Hereinafter, embodiments of the present invention will be described in detail with reference to the attached drawings.

There are a number of multi-antenna transmission schemes or transmission such as transit diversity, closed-loop spatial multiplexing or open-loop spatial multiplexing. Closed-loop MIMO(CL-MIMO) relies on more extensive feedback from the mobile terminal.

A unitary precoding is employed for Single User CL-MIMO(SU CL-MIMO), and unitary codebooks for different antenna configuration are defined. In LTE advance, it can be non-unitary also. Moreover, rank adaptation is also considered in LTE to enhance the performance.

However, in LTE, there is no power allocation among different layers if the rank is larger than 1. It is well known that unitary precoding with water filling power allocation is the optimal solution for CL-MIMO. So the original CL-MIMO in LTE is not optimal.

In this exemplary embodiment, a multi level precoding scheme is proposed for CL-MIMO. In the proposed scheme, we consider the use of two level precoding. The first level procoding is for rank adaptation and power allocation, and the second one is for unitary precoding. With the proposed scheme, we can get optimal solution for CL-MIMO. So it can increase the CL-MIMO performance. By harmonizing rank adaptation and power allocation, we can use fewer coding bits to show the same information so that it can reduce the overhead. Moreover, by using multilevel precoding, we can separately feedback the PMI for each level. The first level PMI is feedbacked less frequently than the second one. So the feedback overhead is further reduced.

FIG. 1 is the block diagram of the wireless communication system using closed-loop spatial multiplexing according to one embodiment.

Referring to FIG. 1, the communication system may be any type of wireless communication system, including but not limited to a MIMO system, SDMA system, CDMA system, OFDMA system, OFDM system, etc. In the communication system, the wireless communication system using closed-loop spatial multiplexing according to one embodiment comprises a transmitter 10 and a receiver 20. The transmitter 10 may act as a base station, while the receiver 20 may act as a subscriber station, which can be virtually any type of wireless one-way or two-way communication device such as a cellular telephone, wireless equipped computer system, and wireless personal digital assistant. Of course, the receiver/subscriber station 20 can also transmits signals which are received by the transmitter/base station 10. The signals communicated between the transmitter 10 and the receiver 20 can include voice, data, electronic mail, video, and other data, voice, and video signals.

In operation, the transmitter 10 transmits a signal data stream through one or more antennas and over a channel to a receiver 20, which combines the received signal from one or more receiver antennas to reconstruct the transmitted data. To transmit the signal, the transmitter 10 prepares a transmission signal represented by the vector for the signal.

The transmitter 10 comprises a layer mapper 30 and a precoder 40.

The layer mapper 30 of the transmitter 10 maps one or two codewords, corresponding to one or two transports, to the layers $N_L$ which may range from a minimum of one layer up to a maximum number of layers equal to the number of antenna ports. In case of multi-antenna transmission, there can be up to two transport blocks of dynamic size for each TTI (Transmission Time Interval), where each transport block corresponds to one codeword in case of downlink spatial multiplexing. In other words, the block of modulation symbols (one block per each transport block) refers to as a codeword. If there is only one codeword, we call it single codeword (SCW). Otherwise, we call it multiple codeword (MCW).

After layer mapping by the layer mapper 30, a set of $N_L$ symbols (one symbol from each layer) is linearly combined and mapped to the $N_A$ antenna port by the precoder 40. This combining/mapping can be described by means of a precoding matrix P of size $N_L \times N_A$.

In various example embodiments, the precoding matrix P is implemented with the matrix P=WD, where D is a first level matrix for rank adaptation and power allocation, and W is a second level matrix for the original precoding. It can be unitary or non-unitary without power allocation information.

The precoder 40 has its own codebook, which is accessed to obtain a transmission profile and/or precoding information to be used to process the input data signal to make best use of the existing channel conditions for individual receiver stations. In addition, the receiver 20 includes the same codebook for use in efficiently transferring information in either the feedback or feedforward channel, as described herein below.

In various embodiments, the codebook is constructed as a composite product codebook from separable sections, where the codebook index may be used to access the different sections of the codebook. For example, one or more predetermined bits from the codebook index are allocated for accessing the first level matrix, while a second set of predetermined bits from the second level index is allocated to indicate the values for the second level matrix.

In various embodiments, instead of having a single codebook at each of the transmitter 10 and the receiver 20, separate codebooks can be stored so that there is, for example, a codebook for the first level precoding matrix W, a codebook for the second level matrix D. In such a case, separate indices may be generated wherein each index points to a codeword in its corresponding codebook, and each of these indices may be transmitted over a feedback channel to the transmitter, so that the transmitter uses these indices to access the corresponding codewords from the corresponding codebooks and determine a transmission profile or precoding information.

Figure 2:
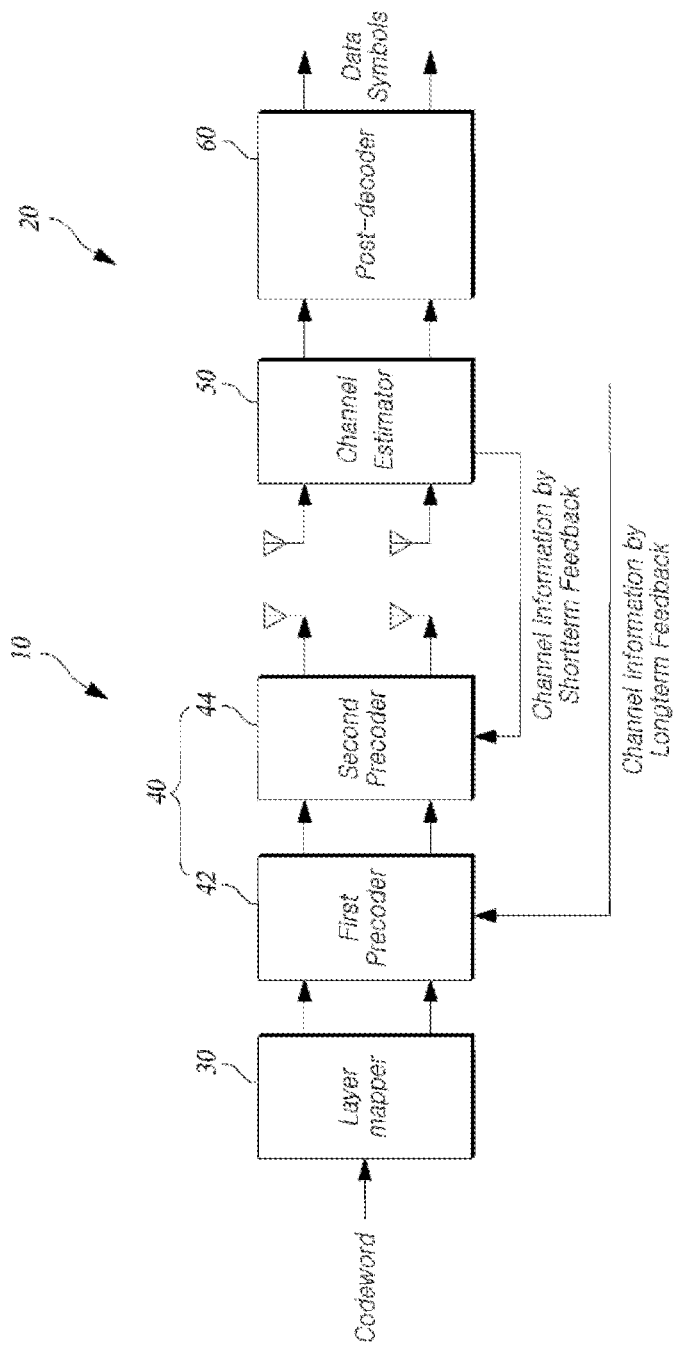
FIG. 2 is the diagram of the precoder according to the other embodiment.

FIG. 2 is the diagram of the precoder according to the other embodiment.

Referring to FIG. 2, after layer mapping by the layer mapper 30, a set of $N_L$ symbols (one symbol from each layer) is linearly combined and mapped to the $N_A$ antenna port by the precoder 40.

The precoder 40 comprises two level precoders 42 and 44 to optimize the performance. The first level precoder 42 is for rank adaptation and power allocation. The second level one 44 is for the original precoding.

In various example embodiments, the first precoder 42 may precode a set of symbols from the layer mapper 30 by means of a precoding matrix D of size $N_L \times N_L$. The second precoder 44 may also precode a set of symbols from the first precoder 42 by means of a precoding matrix W of size $N_L \times N_A$. The precoding matrix D is a first level matrix for rank adaptation and power allocation, and the precoding matrix W is a second level matrix for the original precoding. As a result, the first and the second precoder 42 and 44 precode a set of symbols by means of the matrix P=WD.

To assist the base station in selecting a suitable precoding matrix for transmission by the transmitter (10), the receiver/mobile terminal 20 may report channel information such as a recommended number of layers (expressed as a Rank Indication, RI) or a recommended precoding matrix (Precoding Matrix Index, PMI) corresponding to that number of layers, depending on estimates of the downlink channel conditions.

Referring to FIGS. 1 and 2 again, the receiver 20 comprises a channel estimator 50 and a post-decoder 60.

The channel estimator 50 of the receiver 20 estimates the downlink channel condition. The channel estimator 50 feedbacks at least one of RI and PMI to the transmitter 10. The channel estimator 50 may perform many kinds of codebook based PMI feedback.

The receiver 20 estimates the channel by the channel estimator 50. Based on the estimated channel information, then the receiver 20 selects the precoding matrix for each level from the corresponding codebooks, which can make the system have the highest sum rate. Once the precoding matrix for each level is decided, the receiver/mobile terminal 20 separately feedback the PMIs of both level to the transmitter 10.

There is codebook based PMI feedback where the receiver/mobile terminal 20 feedbacks the precoding matrix index (PMI) of the favorite matrix in the codebook to the transmitter/base station 10 to support CL-MIMO (closed MIMO) operation in wireless communication system.

The feedback frequency of the receiver 20 is different for different level precoding. The first level precoding is for rank adaptation and power allocation, which is decided by the channel amplitude. The second level precoding is for the original precoding, which is mainly decided by the phase. Since the phase changes much faster than the amplitude, the change of PMI feedback for the first level precoding is also much slower than the change of PMI feedback for the second one. So the first level precoding is by long term feedback and the second one is by short term feedback. So multi level precoding can reduce the feedback overhead.

The transmitter 10 receives PMI feedback for the first level precoding by long term and PMI feedback for the second level precoding by short term. The transmitter 10 precodes the set of symbols by means of the precoding matrix P=WD based on the two feedback PMIs as shown in FIG. 1, where D is the first level matrix for rank adaptation and power allocation, and W is the second level matrix for the original precoding. In the other embodiment as shown in FIG. 2, the transmitter 10 precodes the set of data symbols by means of the two level precoders 42 and 44 based on the two feedback PMIs. For example, the first precoder 42 and the second precoder 44 in turn precodes the set of data symbols by means of each of matrices W or D based on the long and the short-term feedback PMIs.

Then the transmitter 10 transmits the precoded data symbols by different antennas.

The receiver 20 recovers the original data symbols by post-decoder 60 with the previous feedback precoding matrices combination. The post-decoder 60 processes the received signal and decodes the precoded symbols.

Figure 3:
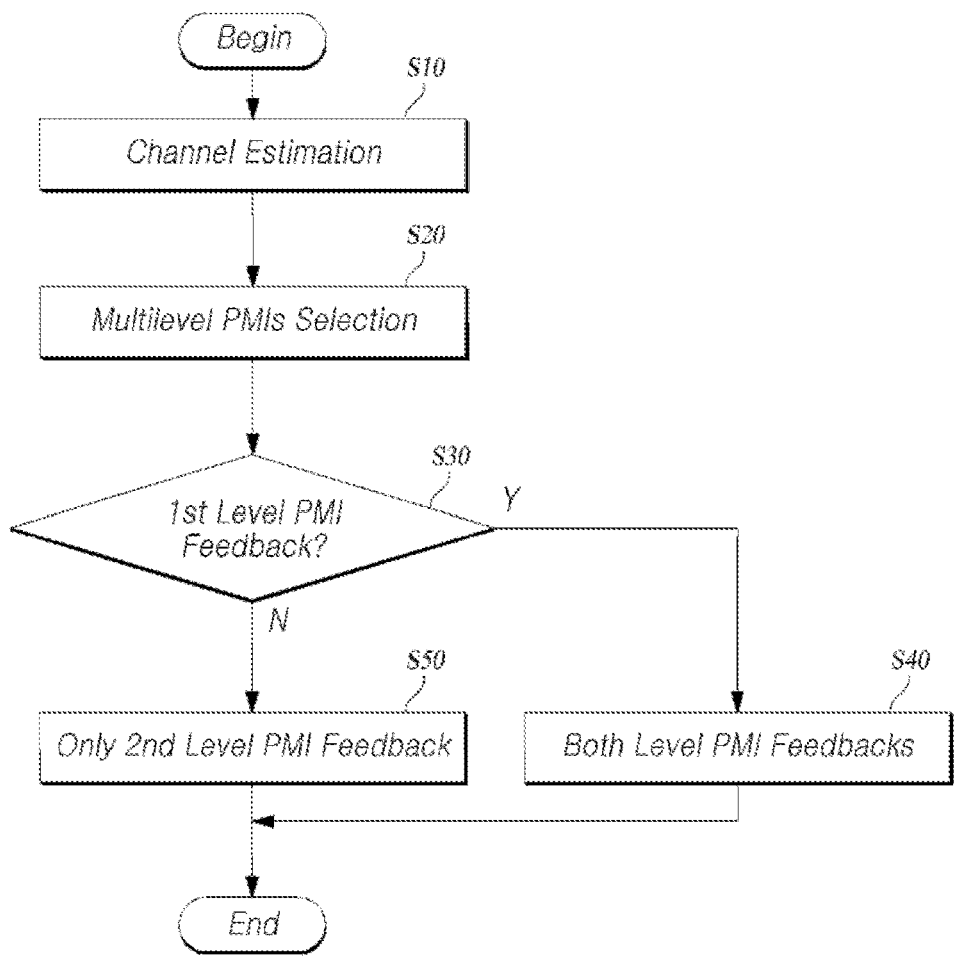
FIG. 3 is the flowchart of the CL-MIMO according to other embodiment.

FIG. 3 is the flowchart of the CL-MIMO according to other embodiment.

Referring to FIGS. 1 to 3, in the multilevel precoding CL-MIMO, the receiver 20 estimates the channel S10. Based on the estimated channel information, the receiver 20 computes the sum rate for all the possible combinations of the two level precoding matrices from the codebooks.

The receiver 20 picks one matrix from the first level codebook and picks another one from the second level codebook. Then the receiver 20 computes the sum rate of the system when combining these two matrices together for precoding. The receiver 20 computes the sum rate for all the possible combinations and selects the one which has the highest sum rate. In other words, the receiver 20 selects the precoding matrix for each level from the corresponding codebooks S20, which has the highest sum rate among all the possible combinations.

Once the precoding matrix for each level is decided, the receiver 20 feedbacks the PMIs of the matrix in the best combination to the transmitter 10.

In multiple level precoding, the first level is for rank adaptation and power allocation, which is decided by the channel amplitude. The second level precoding is the original, which is mainly decided by the phase. Since the phase changes much faster than the amplitude, the change PMI feedback of for the first level precoding is also much slower than the second one.

In multilevel precoding, the first level is for rank adaptation and power allocation. So the codebook is not unitary. By harmonizing rank adaptation and power allocation, we can use fewer coding bits to show the same information so that it can reduce the overhead.

1) For rank adaptation information in the codebook, the identity matrix with some 1 element replaced by zeros can be used. It can also indicate the information that equal power allocation is used. So that we reduce the coding bits 2) For power allocation, it attach to each rank. The total power is not changed. The diagonal matrix is used in the codebook for power allocation.

3) For the exact value for power allocation, we can drive them from transmit adaptive antennas (TxAA) codebook, or by simulation to get the optimized value.

Table 1 gives an example of the first level codebook for 2×2 CL MIMO.1.

TABLE 1

| Codebook index | codebook | Meaning |
|---|---|---|
| 0 | $\begin{bmatrix} 1 & 0 \\ 0 & 0 \end{bmatrix}$ | Rank 1 |
| 1 | $\frac{1}{\sqrt{2}}\begin{bmatrix} 1 & 0 \\ 0 & 1 \end{bmatrix}$ | Rank 2 Equal power allocation |
| 2 | $\begin{bmatrix} \frac{2}{\sqrt{5}} & 0 \\ 0 & \frac{1}{\sqrt{5}} \end{bmatrix}$ | Rank 2 None Equal power allocation |
| 3 | $\begin{bmatrix} \frac{1}{\sqrt{5}} & 0 \\ 0 & \frac{2}{\sqrt{5}} \end{bmatrix}$ | Rank 2 None Equal power allocation |

Referring to the table 1, each of codebook indices has each of codebooks. Each of codebooks means rank adaptation and power allocation. For example, the codebook of codebook index "0" is $$\begin{bmatrix} 1 & 0 \\ 0 & 0 \end{bmatrix},$$

which means rank 1. The codebook of codebook index "1" is $$\frac{1}{\sqrt{2}}\begin{bmatrix} 1 & 0 \\ 0 & 1 \end{bmatrix},$$

which means rank 2 and equal power allocation. The codebook of codebook index "2" is $$\begin{bmatrix} \frac{2}{\sqrt{5}} & 0 \\ 0 & \frac{1}{\sqrt{5}} \end{bmatrix},$$

which means rank 2 and unequal power allocation. The codebook of codebook index "3" is $$\begin{bmatrix} \frac{1}{\sqrt{5}} & 0 \\ 0 & \frac{2}{\sqrt{5}} \end{bmatrix},$$

which means rank 2 and unequal power allocation.

So the receiver 20 does not need feedback the PMIs for both levels all the time. In every feedback, the receiver 20 feedbacks the PMI for the second level precoding. For every several feedbacks, the receiver 20 feedbacks the PMI for the first level precoding.

Before the PMI feedbacks, the receiver 20 checks whether the PMI of the first level need to be feedbacked S30 because the feedback of the first level precoding is less frequent than the feedback of the second one. If the first level precoding is needed, the receiver 20 feedbacks the PMIs for both level precodings to the transmitter separately S40. Otherwise, it only feedbacks the second level precoding S50.

At the transmitter 10, it precodes the data symbols by using the two level precoder based on the feedback PMIs, and then transmit the precoded data symbols by different antennas.

At the receiver 20, it recovers the original data symbols by post-decoder 60 with the previous feedback precoding matrices combination.

In the original LTE CL-MIMO, there is no power allocation among different layers. It is well known that unitary precoding with water filling power allocation is the optimal solution for CL-MIMO. So the original CL-MIMO in LTE is not optimal.

In this exemplary embodiment, a multi level precoding scheme is proposed for CL-MIMO. In the proposed scheme, we consider use two level precoding. The first level precoding is for rank adaptation and power allocation, and the second one is for original precoding. With the proposed scheme, we can get optimal solution for CL-MIMO. So it can increase the CL-MIMO performance.

By harmonizing rank adaptation and power allocation, we can use fewer coding bits to show the same information so that it can reduce the overhead.

By using multilevel precoding, we can separately feedback the PMI for each level. Since the change in the feedback PMI for the first level precoding is much slower than that of the second one, the feedback frequency is different for different level precoding. We feed back the first level PMI less frequently than the second one. So multilevel precoding can reduce the feedback.

The methods and systems as shown and described herein may be implemented in software stored on a computer-readable medium and executed as a computer program on a general purpose or special purpose computer to perform certain tasks. For a hardware implementation, the elements used to perform various signal processing steps at the transmitter (e.g., coding and modulating the data, precoding the modulated signals, preconditioning the precoded signals, and so on) and/or at the receiver (e.g., recovering the transmitted signals, demodulating and decoding the recovered signals, and so on) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. In addition or in the alternative, a software implementation may be used, whereby some or all of the signal processing steps at each of the transmitter and receiver may be implemented with modules (e.g., procedures, functions, and so on) that perform the functions described herein. It will be appreciated that the separation of functionality into modules is for illustrative purposes, and alternative embodiments may merge the functionality of multiple software modules into a single module or may impose an alternate decomposition of functionality of modules. In any software implementation, the software code may be executed by a processor or controller, with the code and any underlying or processed data being stored in any machine-readable or computer-readable storage medium, such as an on-board or external memory unit.

Although the described exemplary embodiments disclosed herein are directed to various MIMO precoding systems and methods for using same, the present invention is not necessarily limited to the example embodiments illustrate herein. For example, various embodiments of a MIMO precoding system and design methodology disclosed herein may be implemented in connection with various proprietary or wireless communication standards, such as IEEE 802.16e, 3GPP-LTE, DVB and other multi-user MIMO systems. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method, comprising:
receiving a first Precoding Matrix Index (PMI) from a terminal through a long term feedback;
receiving a second PMI from the terminal through a short term feedback;
mapping one or two codewords into layers;
precoding data symbols mapped into the layers using a first precoding matrix derived from the first PMI and a second precoding matrix derived from the second PMI; and
transmitting a signal for the precoded data symbols to the terminal through an antenna.

2. The method in claim 1, wherein in the precoding of the data symbols, the data symbols are precoded using a product P=DW of the first precoding matrix (D) and the second precoding matrix (W).

3. A method for feeding back downlink channel information of a terminal, the method comprising:
estimating a downlink channel from a signal received from a base station;
transmitting a first Precoding Matrix Index (PMI) for a first precoding matrix to the base station through a long term feedback;
transmitting a second PMI for a second precoding matrix to the base station through a short term feedback; and
receiving, from the base station, a signal for precoded data symbols through an antenna, the precoded data symbols being mapped into layers based on the first precoding matrix derived from the first PMI and the second precoding matrix derived from the second PMI.

4. A base station, comprising:
a layer mapper configured to map one or two codewords to layers;
a precoder to receive a first Precoding Matrix Index (PMI) from a terminal through a long term feedback, to receive a second PMI from the terminal through a short term feedback, and to generate precoded data symbols mapped into the layers using a first precoding matrix derived from the first PMI and a second precoding matrix derived from the second PMI; and
an antenna to transmit a signal for the precoded data symbols to the terminal.

5. The base station in claim 4, wherein the precoded data symbols comprise data symbols precoded using a product P=DW of the first precoding matrix (D) and the second precoding matrix (W).

6. A mobile terminal, comprising:
a channel estimator configured to estimate a downlink channel from a signal received from a base station, to transmit a first Precoding Matrix Index (PMI) for a first precoding matrix to the base station through a long term feedback, and to transmit a second PMI for a second precoding matrix to the base station through a short term feedback;
a post-decoder configured to decode the received signal to recover data symbols; and
a receiver configured to receive, from the base station, a signal for precoded data symbols through an antenna, the precoded data symbols being mapped into layers based on the first precoding matrix derived from the first PMI and the second precoding matrix derived from the second PMI.

* * * * *